Nov. 14, 1961  P. SERVANTY  3,008,293
INTERMITTENTLY-OPERATING THERMO-PROPULSIVE DUCT DESIGNED FOR
DRIVING A SHAFT AND APPLICABLE TO ROTARY WING AIRCRAFT
Filed May 9, 1958  2 Sheets-Sheet 1
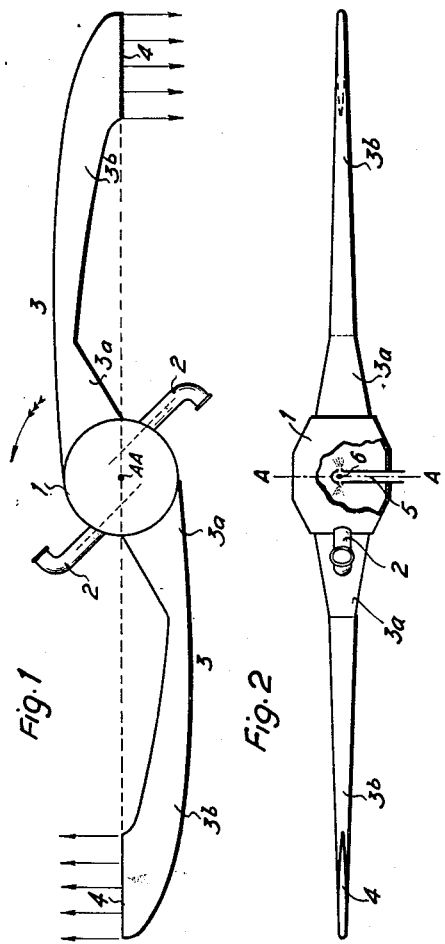
Inventor
Pierre Servanty
By
Watson, Cole, Grindle & Watson
Attorneys Nov. 14, 1961 P. SERVANTY 3,008,293
INTERMITTENTLY-OPERATING THERMO-PROPULSIVE DUCT DESIGNED FOR
DRIVING A SHAFT AND APPLICABLE TO ROTARY WING AIRCRAFT
Filed May 9, 1958 2 Sheets-Sheet 2
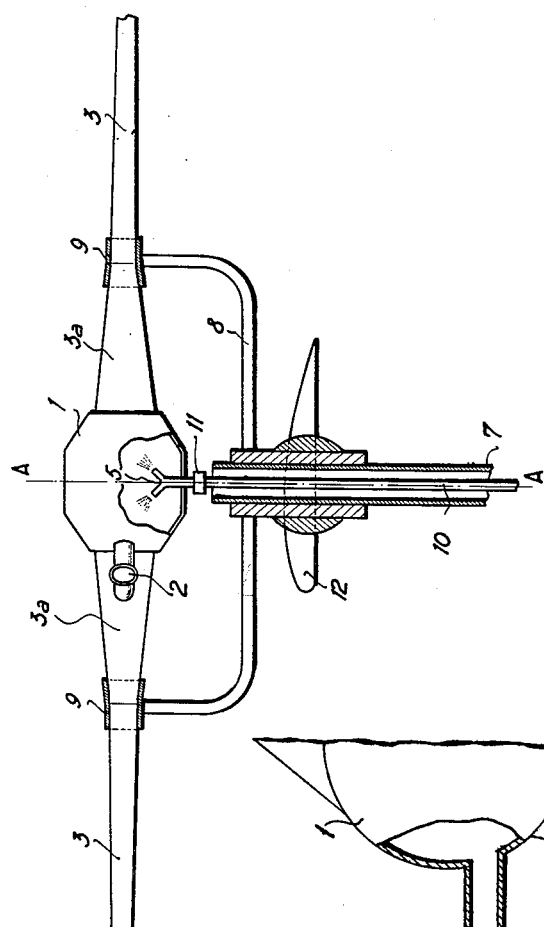
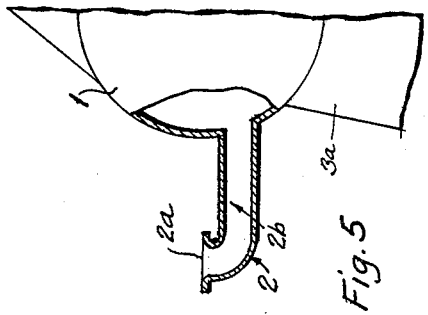
Inventor
Pierre Servanty
By
Watson, Cole, Grindle & Watson
Attorneys

United States Patent Office 3,008,293
Patented Nov. 14, 1961

3,008,293
INTERMITTENTLY - OPERATING THERMO - PROPULSIVE DUCT DESIGNED FOR DRIVING A SHAFT AND APPLICABLE TO ROTARY WING AIRCRAFT
Pierre Servanty, Aulnay, France, assignor to Societe Nationale d'Etude et de Construction de Moteurs d'Aviation, Paris, France, a company of France
Filed May 9, 1958, Ser. No. 734,357
Claims priority, application France May 18, 1957
5 Claims. (Cl. 60—39.34)

It has already been proposed to drive rotary wings, for example the blades of helicopters, by means of thermo-propulsive tubes with periodical functioning, so-called pulse-jet engines, disposed at the ends of the blades, tangentially to the swept circle.

This solution offers, however, in spite of the inherent simplicity of the pulse-jet engine, a certain number of technical difficulties, and involves serious troubles.

First of all the known pulse-jet engines are of considerable length between their air intake orifice and the exhaust orifice of the pulsating jet, particularly when provided with aerodynamic flaps for controlling the intake of air, which is however, the most advantageous embodiment of these engines. Since this length exceeds considerably that of the chord of the blade profile on which the pulse-jet engines are to be attached, prohibitive torsional stresses are generated in the blade. Moreover the weight of a pulse-jet engine of the usual type is considerable, which results in high centrifugal loads which stress the blade in tension and generate prohibitive loads in the hub. This disadvantage naturally becomes more serious the quicker is the rotation of the wing. The centrifugal forces applied to the assembly of the pulse-jet engine arranged on the tip of the wing and particularly acting on the combustion chamber, which is subject to high temperature, are detrimental to the mechanical strength of the metal, the resistance of which decreases with increasing temperature.

The supply of fuel to the combustion chamber is likewise difficult owing to the fact that the radial duct, which has to be associated with the blade for supplying the fuel, acts like a centrifugal pump which at high rotational speeds applies a high pressure to the liquid fuel. Accordingly a throttle device has to be provided in the blade and to be operated by remote control in order to attain a suitable pressure drop and to effect the fuel supply of the pulse-jet engine under the desired end-pressure.

The thermo-propulsive tube with periodical functioning, the so-called pulse-jet engine forming the subject of the present invention overcomes these difficulties and disadvantages.

It forms a real rotary engine functioning on the principle of the "turn-stile," and can be used with the greatest ease for setting in rotation not blades and rotary wings but likewise a shaft or rotary component of any kind.

Its primary feature consists in that the space where the combustion takes place has a form concentrated about the axis of rotation preferably as a body of rotation about this axis, the exhaust pipes being at least two in number and disposed in such a manner as to form an assembly balanced in rotation.

The exhaust pipes have a cross-section of aerofoil shape, particularly near their ends, and terminate in flattened orifices, extending along the trailing edge of the aerofoil profile, and are disposed in such a manner that the flat jets emerging from the said orifices are directed as nearly tangentially as possible with respect to the swept circle.

The air supply pipes of the combustion chamber which are advantageously of the aerodynamic type are preferably multiple and offset from the axis of the chamber so as to form a vortex pit, while the exhaust pipes are likewise offset from the said axis and preferably tangential to the chamber, function as a vortex source, the spiral trajectories having been run through in opposite senses of rotation by the air entering into the chamber and by the combustion gases leaving the same.

Other features of the invention will result from the following description given by way of example with reference to the accompanying drawing, and it must be understood that the features mentioned in the specification as well as those merely disclosed in the drawing form part of the invention.

In the drawing:

FIGURES 1 and 2 are a plan view and an elevation, respectively (partly broken away) of an embodiment of a rotary engine according to the invention.

FIGURE 3 is an elevation in vertical section of such an engine at the end of the shaft to be driven.

FIGURE 4 is a partial elevation view of a modification.

FIGURE 5 is a fragmentary sectional view of a valve means.

In the embodiment illustrated in the FIGURES 1 and 2 the engine comprises a combustion chamber 1 having the shape of a body of rotation about an axis A—A, two air intake tubes 2 for supplying this chamber, and two exhaust pipes 3 for the combustion gases each terminating in an exhaust orifice 4. The air intake tubes 2 are of the type having an aerodynamic flap of known construction. The tubes 2 are provided with elbows in such a manner that the intake of air is effected tangentially, either in the sense opposite to the sense of rotation of the engine about the axis A—A as in FIGURE 2, or in the sense of this rotation as will be described later. The axes of these tubes are moreover disposed in such a manner as not to intersect the axis A—A, the air entering being thus led at its entry to describe a trajectory in the form of a centripetal spiral, in order to form a vortex pit. FIGURE 5 discloses such an aerodynamic tube provided with a slightly convergent inlet 2a extended by a cylindrical portion 2b discharging into the combustion chamber 1. A valve of this type has been described in the U.S. Patent 2,795,931, filed June 5, 1951. The exhaust pipes 3 comprise a first convergent portion 3a connected to the combustion chamber, and a divergent portion 3b. In order to reduce the aerodynamic drag upon the rotation of the engine, these tubes have a flattened form with aerofoil profile and as thin as possible, particularly towards the tips of these tubes where the peripheral speed is the highest. The exhaust orifices 4 have the form of slots so as to issue each a flat jet along the trailing edge of the part of the tubes in the form of a fish tail where they are arranged. These orifices are preferably aligned on one straight line (indicated by a broken line) intersecting the axis of rotation A—A and the end portion of the tubes is preferably turned in such a manner that the stream-lines of the flat jets issuing from the orifices 4 are perpendicular to said straight lines in order not to lose any component of the exhaust velocity of these jets. Like the air intake tubes 2, the exhaust tubes 3 are offset from the axis A—A of the combustion chamber in such a manner that the gases generated in this chamber by the periodical combustions are forced to describe a trajectory in the shape of a centrifugal spiral in order to enter into the convergent portions 3a of these tubes, thus forming a vortex source.

The injection of fuel into the combustion chamber takes place on the axis A—A of this chamber, for example by a nozzle 5 arranged on the axis thereof and pierced by small holes 6 issuing adjacent to the centre of this combustion chamber.

For the use, the engine may be mounted on the end of a shaft 7 which is to be driven rotationally, for example by means of a fork 8 integrated with this shaft, on the prongs of which the exhaust tubes 3 are fixed by means of collars 9, preferably with a resilient packing interposed introducing a certain amount of damping of the vibrations. It is of advantage to make the shaft 7 hollow in such a manner that the supply duct 10 for the fuel can pass through the interior of this shaft and can be connected to the injector nozzle 5 by means of a rotational joint 11.

The mounting set forth hereinabove fixed to the end of a shaft may be readily applied to any rotational shaft belonging to an existing mechanism. It may be used for driving the wing of a helicopter (one blade 12 of which is shown in FIGURE 3) the shaft 7 on which said wing is mounted is usually made hollow.

It will moreover be of advantage in this application to make arrangement that the tubes 3 are positioned on radii different from those occupied by the blades of the wing so as not to disturb the air flow over these blades. (This is what is shown in FIGURE 3, where these radii are offset 90° from one another.)

The number of exhaust tubes 3, by the way, like that of the intake tubes 2, may be different from two.

For example an engine could be built with three exhaust tubes angularly offset 120° one from the others and likewise three intake tubes offset the same angle, or alternatively an engine with four exhaust tubes angularly offset 90° one from the others and with four intake tubes. The number of intake tubes may, by the way, be different from that of the exhaust tubes.

Hereinabove it has been indicated that the air intake tubes may be orientated in various manners.

It is known that an aerodynamic flap always lets escape a certain quantity of gas at each combustion. This mass of gas possesses a certain amount of momentum and consequently in the case of a tube having a tangential intake produces a torque which is positive or negative with respect to the driving torque generated by the principal jets emerging from the exhaust tubes 3.

In the case of a machine which has to deliver its output at a comparatively low rotational speed it would be advantageous to orientate the tangential entries of the intake tubes in the sense opposite to the speed of rotation in order to obviate a negative torque which is detrimental at low speeds.

In contrast, in the case where the engine has to deliver its output at comparativley high rotational speeds it is advantageous to orientate the tangential portion of the intake tubes in such a manner that these entries open in the sense of the movement, in order to take advantage of the dynamic pressure for improving the filling of the combustion chamber, this dynamic pressure being opposed by the way to the leakages of gas.

The supply tubes 2 may alternatively have elbows in such a manner that their entries are parallel to the axis of rotation, as shown in FIGURE 4. This disposition will be advantageous, notably in the case of small engines; for by directing the openings downwardly advantage could be taken of the pressure in the combustion chamber after each combustion.

What I claim is:

1. A pulse-jet engine permitting to drive a shaft in rotation, comprising one cylindrical-shaped combustion chamber concentrated about the axis of rotation of said shaft, fuel injection means in the axis of said chamber in the vicinity of the center of said chamber, at least two exhaust pipes in communication with said chamber and disposed so as to form an assembly rotationally balanced, the inlets of said exhaust pipes being axially offset with respect to the combustion chamber in order to operate as a vortex source, at least two air supply tubes of the aerodynamic type in communication with said combustion chamber and situated in the plane of rotation of said exhaust pipes, said tubes being axially offset from the combustion chamber in order to form a vortex pit.

2. A pulse-jet engine according to claim 1 wherein the inlets of said air supply tubes are directed in the direction of rotation of said shaft for the comparatively high rotary speeds.

3. A pulse-jet engine according to claim 1 wherein the outlets of said exhaust pipes, symmetrical with respect to the axis of rotation of said shaft, are situated in a common plane containing said axis of rotation.

4. A pulse-jet according to claim 1 wherein the inlets of said air supply tubes are parallel to the axis of rotation of said shaft.

5. A pulse-jet engine according to claim 1 wherein the inlets of said air supply tubes are directed in a direction opposite to the direction of rotation of said shaft for the comparatively low rotary speeds.

References Cited in the file of this patent

UNITED STATES PATENTS

| | | |
|---|---|---|
| 2,543,758 | Bodine | Mar. 6, 1951 |
| 2,631,676 | Hiller | Mar. 17, 1953 |
| 2,651,376 | Stanitz | Sept. 8, 1953 |
| 2,686,567 | Da Silva Costa | Aug. 17, 1954 |
| 2,805,545 | Wilman | Sept. 10, 1957 |
| 2,812,635 | J. Le Foll et al. | Nov. 12, 1957 |
| 2,818,122 | J. G. Johnston | Dec. 31, 1957 |

FOREIGN PATENTS

| | | |
|---|---|---|
| 28,869 | France | Jan. 8, 1925 |
| | (1st addition to No. 570,826.) | |
| 281,852 | Switzerland | July 16, 1952 |